June 24, 1930.  W. G. PRICE  1,766,540
HYDRAULIC BRAKING METHOD AND APPARATUS
Filed Feb. 26, 1927  2 Sheets-Sheet 1
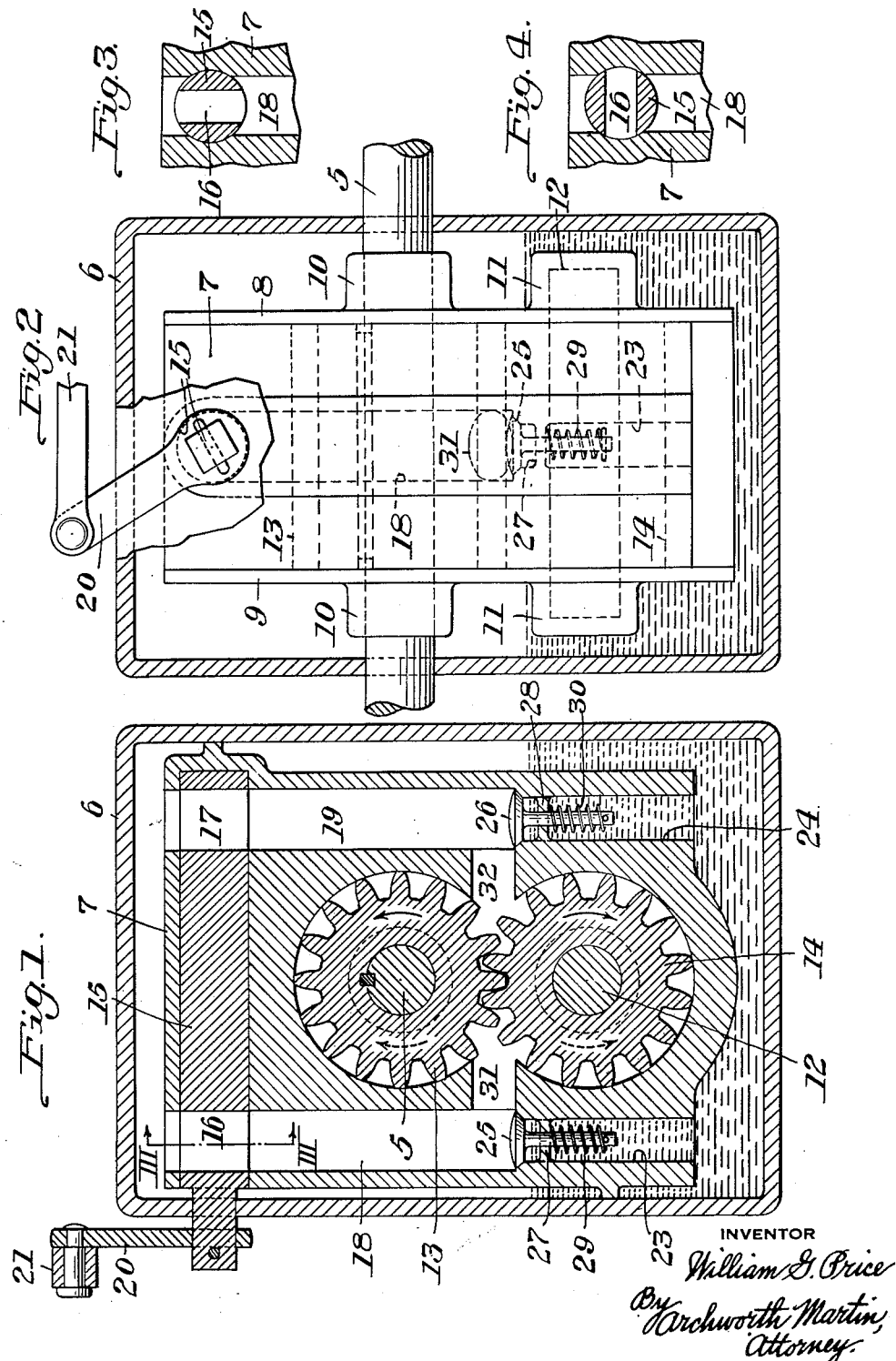
INVENTOR
William G. Price
By Archworth Martin,
Attorney.

June 24, 1930.  W. G. PRICE  1,766,540
HYDRAULIC BRAKING METHOD AND APPARATUS
Filed Feb. 26, 1927   2 Sheets-Sheet 2
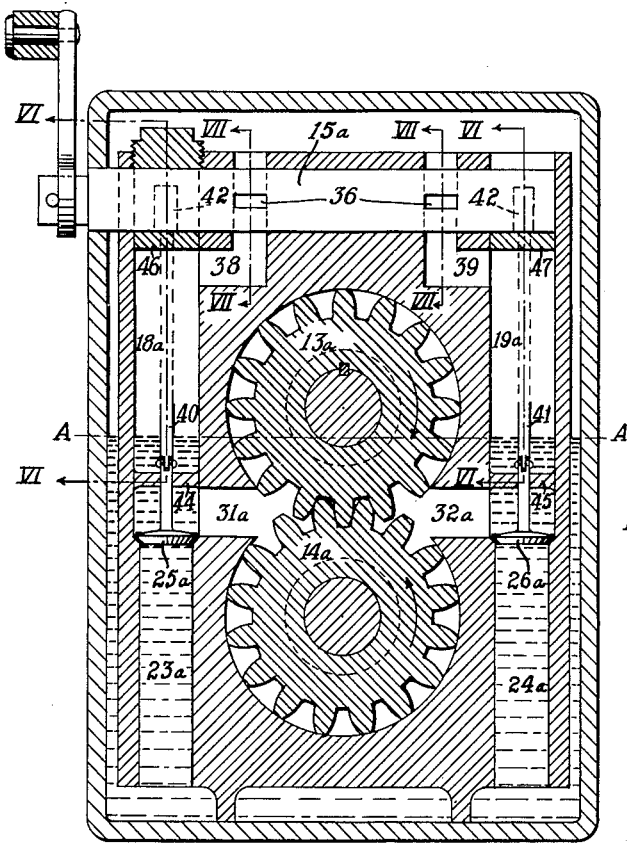
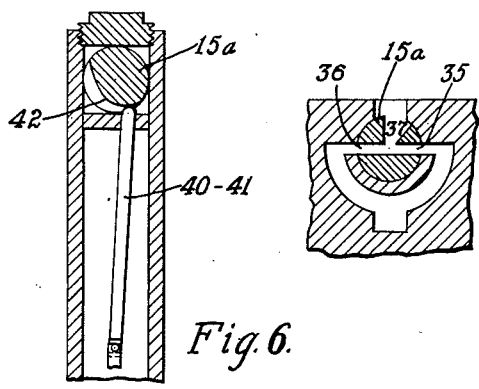
INVENTOR
William G. Price
BY Archworth Martin
ATTORNEY Patented June 24, 1930

1,766,540

UNITED STATES PATENT OFFICE

WILLIAM G. PRICE, OF YAKIMA, WASHINGTON; MARY KELLEY PRICE EXECUTRIX OF SAID WILLIAM G. PRICE, DECEASED

HYDRAULIC BRAKING METHOD AND APPARATUS

Application filed February 26, 1927. Serial No. 171,187.

My invention relates to hydraulic brakes of that type wherein liquid is placed under compression to retard the movement of the transmission mechanism of motor vehicles or other machinery.

For convenience of description, the invention is hereinafter described as employing oil as the liquid medium and as applied to automobiles, but it will be understood that liquids other than oil may be employed and that the invention is applicable to various other types of machinery as above indicated.

In the embodiment of my invention herein described, I disclose a gear pump arrangement for actuating or operating upon the oil, to produce the desired braking forces, and secure the hereinafter enumerated advantages by the use of but a single valve-control lever and only two check valves, in combination with the necessary ports and passages for the movement of air and oil within the system.

One object of my invention is to provide a simplified form of control mechanism which permits the pump to operate only upon either the air in the system or the oil contained therein, and which can be adjusted to cause the pump to operate upon the oil and the air simultaneously, in any desired relative degree.

Another object of my invention is to provide a control mechanism of simple form, whereby the braking forces which can be created when a vehicle is moving in one direction, may be duplicated to retard movement of the vehicle in the opposite direction.

Still another object of my invention is to simplify and improve generally the operation and efficiency of fluid pressure brakes.

In the accompanying drawings, Figure 1 is a cross sectional view, in elevation, of one form of apparatus embodying my invention; Fig. 2 is a view, taken at right angles to Fig. 1, but showing the oil reservoir in section and the pump casing in elevation; Fig. 3 is a view taken on the line III—III of Fig. 1, showing the control valve in open position; Fig. 4 is a similar view, with the valve turned 90 degrees, to closed position; Fig. 5 is a view similar to Fig. 1, but showing a modification; Fig. 6 is a view taken on either of the lines VI—VI of Fig. 5, and Fig. 7 is a view taken on one of the lines VII—VII of Fig. 5.

Referring now to Figs. 1 to 4, the apparatus is shown as employed for braking or retarding the movement of a shaft 5 that may be the transmission shaft of an automobile or another shaft connected, in any suitable manner, to the differential gearing (not shown) and axles of the automobile. The reservoir or main casing 6 is rigidly supported in any suitable manner, the shaft 5 extending through the end walls thereof as shown in Fig. 2. A gear or pump casing 7 is supported within the reservoir 6 and has end plates 8 and 9 through which the shaft 5 extends and which are provided with extensions 10 that serve as bearings. The end plates 8 and 9 are also provided with recessed bosses 11 that serve as bearings for a shaft 12.

A gear wheel 13 is rigidly secured to the shaft 5 and a gear wheel 14 is mounted upon the shaft 12, so that as the shaft 5 rotates, the gear wheels 13 and 14 will also be rotated.

The upper end of the casing 7 has a bore within which a rotary valve 15 is supported, the valve 15 being provided with ports 16 and 17 that are movable into registry with conduits 18 and 19 respectively, to control flow through said conduits in either direction, the valve 15 having a stem portion that extends through the side of the reservoir 6 and is connected through a crank 20 to one end of an operating lever or pull rod 21. The opposite end of the rod 21 may be connected to the brake pedal (not shown) of an automobile, or to any other suitable operating means.

Near the lower end of the pump casing 7, I provide ducts 23 and 24 through which oil may flow upwardly under conditions to be hereinafter described, but wherein downward or backflow of oil is prevented by check valves 25 and 26 respectively. The valves 25 and 26 are provided with guide stems that are slidably supported in webs or ribs 27 and 28 and are normally yieldably held in closed position by means of compression springs 29 and 30. The normal level of oil in the casing is slightly below these valves, as indicated by the shade lines.

Upon rotation of the gears or toothed pumping elements 13 and 14, within their chamber in the pump casing, fluid will be entrapped by the teeth of such elements and caused to flow through passages or ports 31 and 32 that extend through the side walls of the pump casing 7, the direction of flow depending upon the direction in which the shaft 5 is being driven. If the valve 15 is in fully open position, as shown in Figs. 1 and 3, the gear wheels 13 and 14, if driven in the directions indicated by the full-line arrows, will set up a flow of air from a source such as the upper part of the casing 6, through the valve port 17 downward through the conduit 19, through passage 32 and the pump chamber, out through the passage 31 and upwardly through the conduit 18 and the port 16, and no substantial braking or retarding effect will be produced. If the link 21 is drawn to the right (Fig. 2) the ports 16 and 17 will be turned toward the position shown in Fig. 4. At some intermediate position, determined by the speed at which the rotatable parts are moving, flow of air through the port 17 will be restricted to such an extent that a partial vacuum will be created within the conduit 19 and the passage 32, so that oil will be drawn from the duct 24, past the check valve 26, and directed through the passage 31 and the conduit 18. The flow of fluid from the passage 18 will be restricted by reason of the port 16 having been moved to partially closed position through operation of the link 21 as above explained, so that a braking force will be exerted. It will be apparent that if the link 21 is moved to the extreme right and the ports 16 and 17 completely closed, as shown in Fig. 4, no air can be drawn in by the gear wheels and all of their pumping effect will be exerted upon the oil in the duct 24. Furthermore, the oil drawn from the duct 24 cannot pass the port 16, so that a very great braking force is created, which resists rotative movement of the shaft 5, and hence of the mechanism to which it may be connected.

It will be seen that any desired degree of braking force may be set up by rotating the valve 15 to such position that there is the proper resistance to downflow of air through the port 17 and to the exhaust of fluid through the port 16. It will further be seen that if the shaft 5 is so rotated as to cause the gear pump members 13 and 14 to be rotated in the direction indicated by the dotted arrows, that the flow of liquid and air will be in directions the reverse of those above described as taking place when the gear members 13 and 14 are rotated in the direction indicated by the full-line arrows, since the check valve 25 will be movable to permit flow of oil from the duct 23 and the valve 26 serving as a check against flow of oil downwardly through the duct 24.

In Figs. 5 to 7, I show an arrangement wherein the check valves are positively held against their seats when the rotary valve is in release or non-braking position, to prevent oil being drawn into the pump casing, and wherein the oil level in the reservoir may be above the horizontal plane of the check valves so that when the pump is functioning, oil will be fed thereto under gravity flow, instead of depending upon the suction of the pump gears.

The rotary valve 15$^a$ is provided with ports 35, 36 and 37 controlling flow through passages 38—18$^a$ and 39—19$^a$ in a manner similar to control of flow through ports and passages 16—18 and 17—19 of Figs. 1 and 2.

Flow of oil to the ports 31$^a$ and 32$^a$ takes place through ducts 23$^a$ and 24$^a$, past check valves 25$^a$ and 26$^a$ respectively, when such valves are permitted to open, as in the case of the structure of Fig. 1. Thrust rods 40 and 41 have jointed connection with the stems or valves 25$^a$ and 26$^a$ respectively, and the upper ends of these rods are engaged by the raised portions 42 that comprise the inner walls of cam slots that are cut in rotary valve member 15$^a$, so that when such valve member is in non-braking position, as shown in Figs. 5 and 6, the valves 25$^a$ and 26$^a$ are held tightly to their seats, and if the pump gears 13$^a$ and 14$^a$ are rotated in the direction of the arrows, for instance, there will be no suction of oil past valve 26$^a$ through unseating of said valve by jolting of the vehicle, abnormal suction, etc. When the pump members 13$^a$ and 14$^a$ are rotated as indicated by the arrows, air will be drawn through passages 38—18$^a$ and directed outwardly through the passages 19$^a$—39, the oil which happens to be present in such passages and in the ports 31$^a$—32$^a$ being forced out and the pump thereafter working only on air, until the valve 15$^a$ is turned to braking position, to release the valves 25$^a$ and 26$^a$ and to retard flow through the passages 38 and 39. Movement of the pump gears in the reverse direction will operate to cause the oil to flow past the valve 25$^a$ and the valve 26$^a$ will be held to its seat by reason of the pressure of the oil upon which the pump is acting. The stems of the valves 25$^a$ and 26$^a$ extend through and are guided by bars 44 and 45, which are narrow so as to permit comparatively free flow of oil and air through the passages 18$^a$ and 19$^a$ respectively. The push rods 40 and 41 operate through guides 46 and 47, the rods 40 and 41 having jointed connection with the valve stems, so as to eliminate binding of said stems and rods in their guide.

The oil may be maintained at approximately the level A—A or higher, so that there will be freer flow of oil to the pump during braking operations. Notwithstanding the comparatively high level of oil, the gears will not pump oil when the control valve 15ª is turned to inoperative position, save for the small amount of oil which may be temporarily present in the ports 31ª and 32ª and the lower ends of the conduits 18ª and 19ª, which oil is quickly expelled into the main portion of the reservoir as above explained.

The ports 35 and 36 (Fig. 7) are closed, or nearly closed, when the valve 15ª is turned to braking position, but the ports 37 are of such width that they are never completely closed, thus avoiding the presence of unequalized pressures on the valve 15ª that would tend to resist turning movement thereof.

I claim as my invention:—

1. Hydraulic braking apparatus comprising a liquid reservoir, a pump casing having ports in opposite sides thereof, pumping mechanism within the casing, a duct affording communication between each of said ports and said reservoir, a check valve for each port, each having opening movement in a direction toward its associated port, and a conduit communicating with each of said ports and arranged to receive liquid drawn from one of said ducts through operation of the pumping mechanism.

2. Hydraulic braking apparatus comprising a liquid reservoir, a pump casing having ports in opposite sides thereof, pumping mechanism within the casing, a duct affording communication between each of said ports and said reservoir, a check valve for each port, each having opening movement in a direction toward its associated port, a conduit communicating with each of said ports and arranged to receive liquid drawn from one of said ducts through operation of the pumping mechanism, and means for controlling flow through said conduits.

3. Hydraulic braking apparatus comprising a liquid reservoir, a pump casing having ports in opposite sides thereof, pumping mechanism within the casing, a duct affording communication between each of said ports and said reservoir, a check valve for each port, each having opening movement in a direction toward its associated port, a conduit communicating with each of said ports and arranged to receive liquid drawn from one of said ducts through operation of the pumping mechanism, and means for controlling flow through said conduits in predetermined relation.

4. Hydraulic braking apparatus comprising a liquid reservoir, a pump casing having ports in opposite sides thereof, pumping mechanism within the casing, a duct affording communication between each of said ports and said reservoir, a check valve for each port, each having opening movement in a direction toward its associated port, a conduit communicating with each of said ports and arranged to receive liquid drawn from one of said ducts through operation of the pumping mechanism, a valve for each of said conduits, and means for actuating said valves by a single operating member.

5. Hydraulic braking apparatus comprising a liquid reservoir, a pump casing having ports in opposite sides thereof, pumping mechanism within the casing, a duct affording communication between each of said ports and said reservoir, a check valve for each port, each having opening movement in a direction toward its associated port, a conduit communicating with each of said ports and arranged to receive liquid drawn from one of said ducts through operation of the pumping mechanism, a valve for each of said conduits, and means for actuating said valves in synchronism, by a single operating member.

6. Hydraulic brake apparatus comprising a liquid reservoir, a pump casing having two oppositely disposed ports located above the normal liquid level, an oil duct adjacent to each port and extending to a point below the liquid level, an upwardly opening check valve for each duct, a conduit extending upwardly from the outer end of each of said ports, and pumping mechanism within said casing for effecting a flow of liquid through said ports.

7. Hydraulic brake apparatus comprising a liquid reservoir, a pump casing having two oppositely disposed ports located above the normal liquid level, an oil duct adjacent to each port and extending to a point below the liquid level, an upwardly opening check valve for each port, a conduit extending upwardly from the outer end of each of said ports, pumping mechanism within said casing for effecting a flow of liquid through said ports, and means for restricting flow through said conduits.

8. Hydraulic brake apparatus comprising a liquid reservoir, a pump casing having two oppositely disposed ports located above the normal liquid level, an oil duct adjacent to each port and extending to a point below the liquid level, an upwardly opening check valve for each port, a conduit extending upwardly from the outer end of each of said ports, pumping mechanism within said casing for effecting a flow of liquid through said ports, and a single valve control means for said conduits.

9. Braking apparatus comprising a driven shaft, pump mechanism connected to said shaft, a pump chamber for said mechanism having two ports, two passage-ways extending from points below said ports to points above the same; check valves located in said passage-ways at points below said ports, and a control valve for each of said passages at points above said ports.

10. Braking apparatus comprising a driven shaft, pump mechanism connected to said shaft, a pump chamber for said mechanism having two ports, two passage-ways extending from points below said ports to points above the same; check valves located in said passage-ways at points below said ports, a control valve for each of said passages at points above said ports, and a liquid-containing reservoir surrounding said pump casing and passage ways and having communication with both ends of each passage way.

11. Braking apparatus comprising a pump, a source of air supply, a source of liquid supply, means permitting the pump to draw upon said supplies in desired relative quantities, when the pump is operating in one direction, a passage-way to which the air and oil may be directed when the pump is operating in said direction, means permitting the pump to draw upon said air source and liquid source when operating in the opposite direction, and a passage way to which said oil and air may be directed by the pump.

12. Braking apparatus comprising a pump, a source of air supply, a source of liquid supply, means permitting the pump to draw upon said supplies in desired relative quantities, when the pump is operating in one direction, a passage-way to which the air and liquid may be directed when the pump is operating in said direction, means permitting the pump to draw upon said air source and liquid source when operating in the opposite direction, a passage-way to which said liquid and air may be directed by the pump when operating in said opposite direction, and means for restricting flow through said passageways.

13. Hydraulic braking apparatus comprising a liquid reservoir, a pump casing having ports in opposite sides thereof, pumping mechanism within the casing, a duct affording communication between each of said ports and said reservoir, a check valve for each port, each having opening movement in a direction toward its associated port, and a conduit communicating with each of said ports and arranged to receive liquid drawn from one of said ducts through operation of the pumping mechanism, the said conduits each discharging directly to the reservoir.

14. Hydraulic brake apparatus comprising a liquid reservoir, a pump casing having two oppositely disposed ports located above the normal liquid level, an oil duct adjacent to each port and extending to a point below the liquid level, an upwardly opening check valve for each duct, a conduit extending upwardly from the outer end of each of said ports, and pumping mechanism within said casing for effecting a flow of liquid through said ports, the said conduits each discharging directly to the reservoir.

15. Hydraulic braking apparatus, comprising a movable member whose motion is to be retarded by braking forces, a source of liquid, a pump chamber having an inlet communicating with said source and an air space and provided with a pair of ports, a pumping element in said chamber between said ports, a driving connection between said member and said element, and means for directing liquid from said inlet to one port when the pump is operated through movement of said member in one direction and for directing the incoming liquid to the other port when the said member is moved in the opposite direction.

16. Hydraulic brake apparatus comprising a liquid reservoir having two ducts permitting flow of liquid from said reservoir, an outwardly opening check valve for each duct, a pump casing provided with two oppositely disposed ports each having communication with one of said ducts when the valve associated therewith is open, a conduit communicating with each side of the pump casing and its outer end extending to a point above the normal liquid level in the reservoir, but communicating therewith, and pumping mechanism within said casing for effecting a flow of liquid through said ports.

17. In combination, a vehicle, a hydraulic brake mechanism therefor having an oil supply for effecting braking action irrespective of the direction of movement of the vehicle, and means for admitting air to said mechanism to arrest braking action irrespective of the vehicular direction against which braking action is applied.

18. A vehicular hydraulic brake having an endless path common to air and oil agencies, and means for controlling movement of one of said agencies to cause operation of said brake by the other of said agencies.

19. A hydraulic brake mechanism having an endless path common to air and oil, and means for controlling the passage of air through said path to govern the brake operation of oil through said path.

20. In a vehicular hydraulic brake mechanism, a casing having pressure chambers and vehicle driven gears interposed between said chambers causing either to act as a suction or pressure chamber dependent upon the direction of rotation of said gears to ingress or egress oil thereto or therefrom, said casing having a passage leading from one chamber to the other, and a controlling valve for governing oil egress from either chamber through said passage to control the imposition of brakage irrespective of the vehicular direction against which brakage is applied.

21. In a vehicular hydraulic brake mechanism, a casing having pressure chambers and vehicle driven gears interposed between said chambers causing either to act as a suction or pressure chamber dependent upon the direction of rotation of said gears to ingress or egress oil thereto or therefrom, said casing having a passage leading from one of said chambers to the other, and a valve in said passage for controlling admission of air to one of said chambers to arrest braking application irrespective of the vehicular direction against which such application is made.

22. In a vehicular hydraulic brake mechanism, a casing having pressure chambers and vehicle driven gears interposed between said chambers causing either to act as an oil suction or oil pressure chamber, said casing having a passage leading from one chamber to the other, and a valve interposed in said passage for controlling egress of oil or air from either chamber to initiate and sustain braking stress and said valve affording admission of air to said chambers to arrest braking stress.

23. The herein-described method of applying method of applying and arresting the application of brakage, which consists, in inducing a flow of oil toward a congested area to apply brakage, and in admitting air toward such congested area to vitiate oil suction and stop the flow of oil and arrest the application of brakage.

24. In combination, a vehicle, a hydraulic brake mechanism including opposed chambers and vehicle driven gears for filling either chamber with oil, and means for admitting air to the non-filling chamber to arrest further flow of oil thereto.

25. In combination, a vehicle, a hydraulic brake mechanism therefor including opposed chambers and vehicle driven gears for filling either chamber with oil, and means admitting air to the non-filling chamber to arrest inflow of oil thereto and express oil from the filled chamber.

In testimony whereof I, the said WILLIAM G. PRICE, have hereunto set my hand.

WILLIAM G. PRICE.